United States Patent

Gartz

[11] Patent Number: 5,896,730
[45] Date of Patent: Apr. 27, 1999

[54] CASE TRAY AND METHOD FOR HOLDING COMPACT DISCS

[76] Inventor: Kaj Gartz, 275 Hemlock Dr., Orange, Conn. 06477

[21] Appl. No.: 09/002,568

[22] Filed: Dec. 31, 1997

Related U.S. Application Data

[62] Division of application No. 08/795,385, Feb. 4, 1997, Pat. No. 5,803,251.

[51] Int. Cl.$^6$ .................................................. B65B 05/10
[52] U.S. Cl. ................................. 53/475; 53/409; 53/472
[58] Field of Search ............................... 53/409, 445, 472, 53/474, 475

[56] References Cited

U.S. PATENT DOCUMENTS

| | | | |
|---|---|---|---|
| 5,244,085 | 9/1993 | Lammerant et al. | 206/308.1 |
| 5,269,409 | 12/1993 | Brandt et al. | 206/310 X |
| 5,284,243 | 2/1994 | Gelardi et al. | 206/310 |
| 5,284,248 | 2/1994 | Dunker | 206/310 X |
| 5,417,324 | 5/1995 | Joyce et al. | 206/310 |
| 5,450,951 | 9/1995 | Luckow | 206/308.1 |
| 5,515,968 | 5/1996 | Taniyama | 206/308.1 X |
| 5,558,220 | 9/1996 | Gartz | 206/308.1 |
| 5,586,651 | 12/1996 | Krummenacher | 206/310 |
| 5,626,225 | 5/1997 | Joyce | 206/309 X |
| 5,651,458 | 7/1997 | Brosmith et al. | 206/310 X |
| 5,658,425 | 8/1997 | Choi | 206/310 |
| 5,746,315 | 5/1998 | Luckow | 206/310 |

*Primary Examiner*—Daniel B. Moon

[57] ABSTRACT

A double-sided plastic tray (12) for holding two compact discs. The tray has a disc-receiving surface (35a) on its face and obverse sides and a tray opening (61) is disposed thereon. A hub (50) comprising an array of tabs (51) is disposed on the surface (35a). Proximal ends of the tabs are attached to the tray opening (61) and distal ends can reciprocate within the tray opening (61). Prongs (54) are disposed on one side of the distal ends and reciprocate with the tab (51) when they are engaged by the internal rim (60) of a disc and grasp the internal rim (60) to detachably and resiliently hold one compact disc. Shoulders (55) are disposed on opposite sides of the tabs (51). Shoulders (55) reciprocate with tabs (51) when prongs (54) are engaged by the internal rim (60) of a second compact disc to inhibit lateral movement of the second compact disc held by prongs on the opposite side of the surface (35a) and inhibit breakage of the tabs (51). Since prongs (54) and shoulders (55) are disposed on both the face and obverse sides of the tray (35), two compact discs can be held simultaneously and both can be restrained from lateral movement which would break the tabs (51).

4 Claims, 4 Drawing Sheets

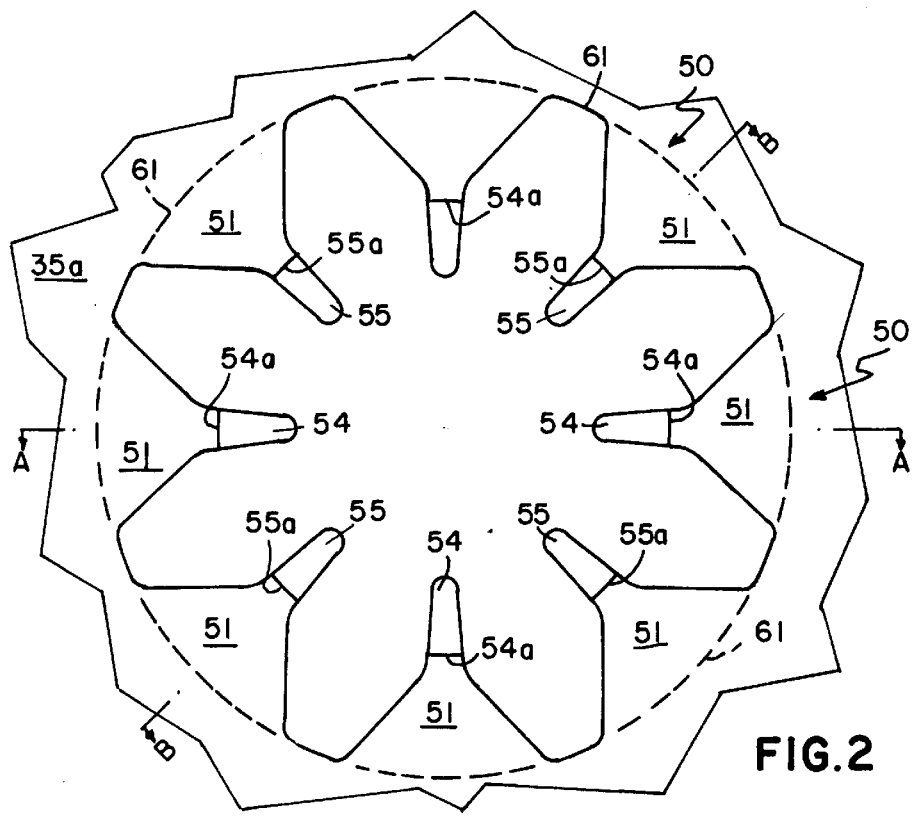
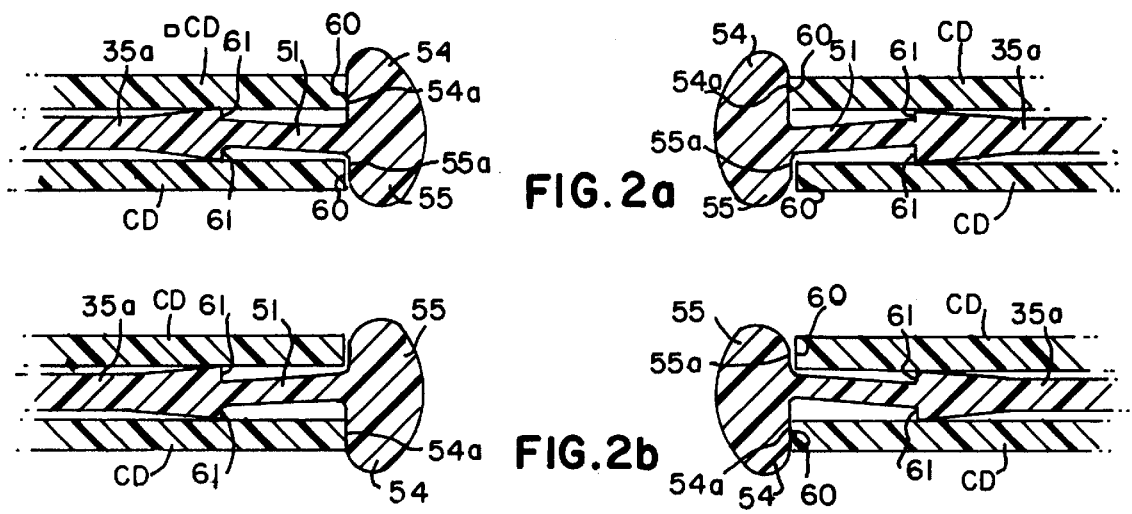

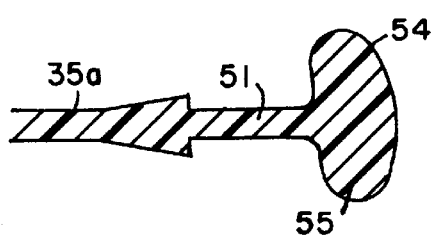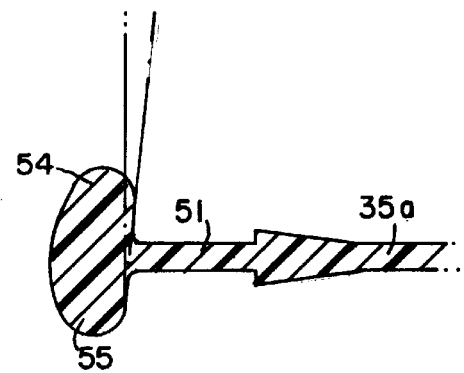
FIG. 4

CASE TRAY AND METHOD FOR HOLDING COMPACT DISCS

RELATIONSHIP TO OTHER APPLICATIONS

This application is a division of Ser. No. 08/795,385 filed Feb. 4, 1997 now U.S. Pat. No. 5,803,251.

FIELD OF THE INVENTION

The present invention relates to a tray for holding two high density recording discs, commonly known as compact discs or CDs. The invention particularly relates to a case with a structurally stable tray to hold two compact discs which compensates for dimensional differences between different compact discs. The invention is particularly suitable for use with trays molded of brittle and/or transparent plastics.

BACKGROUND OF THE INVENTION

Cases for holding compact discs are well known to the art. Such cases can made of molded polystyrene, impact (rubber-doped) styrene, polyethylene or polypropylene. These cases are an inexpensive packaging which are used to store and display the discs for sale. Even though the case is relatively inexpensive, when compared to the cost of the compact discs it holds, it must be strong enough to hold the discs over a long period of time and withstand frequent opening, closing, dropping and rough handling during shipping and processing on an automated assembly line. Industry requirements and consumer preferences have dictated the dimensions of the case. Sizes greater than these dimensions, especially greater thicknesses, have led to a lack of acceptance by the retailers because oversized cases take up more shelf space and by the consumers because they are more difficult to store, especially by those who own large numbers of compact discs.

The recording, software, game and movie industries currently market works which are so lengthy they require more than one compact disc. Increasing the thickness of the case to accommodate a second disc is not always acceptable to the consumer. The industry has sought a case for two compact discs which has the same thickness as a case for the single compact disc and is compatible with automated packaging equipment currently in use.

Popular cases currently available for storing compact discs include a rectangular base, a corresponding rectangular cover pivotally connected to the base and a rectangular tray for holding the compact disc fixedly connected to the base. The rectangular tray includes a receiving surface for the disc and a circularly-shaped, radially-disposed array of spring fingers which receive the center hole of the compact disc and hold it there by an interference fit.

The United States Patent to Lammerant et al., U.S. Pat. No. 5,244,085, and the United States Patent to Dunker, U.S. Pat. No. 5,284,248, disclose a modification of existing compact disc cases which enables the storage of two compact discs in a case previously adapted to hold only one compact disc. To provide for holding two compact discs, a tray which heretofore had been fixedly held within the base of the case was pivotally mounted in the base so access to the tray can be gained from either side of it. The compact discs are held by a tenon system including teeth which stand around an opening formed in the tray. Half of the teeth stand facing the cover and the other half stand facing the base. One set of teeth holds one compact disc and the other set holds another compact disc on the opposite side of the tray. The individual teeth are supported by a ring disposed within the opening in the tray. The ring is suspended from the opening by a radial arrangement of spokes. Such spokes are relatively weak and cannot always support the weight of the compact discs. Dropping a case will frequently break or shear the spokes or the teeth and render the tray inoperative. In addition, small differences in diameters of the center holes of the compact discs (in the order of 0.1 to 0.2 mm) can also break the spokes and teeth during automatic assembly operations which place discs on trays at rates up to 80 discs per minute.

To provide additional strength to the trays and the spokes, the composition of the trays was modified by doping it with a rubber to make the components more resilient. Doping allows the teeth to move laterally without breaking as easily. But doping the styrene with rubber causes the tray to become opaque and adopt the color of the dopant which makes the appearance less desirable.

Literature providing sales and identification materials is conventionally disposed within the case against the cover, the base and the spine. Information stored beneath the tray cannot be seen through an opaque tray. Because the package allows limited area for art work and information, a transparent tray can increase the value of the case by adding another viewing surface. But since the styrene is extremely rigid and because the teeth which hold the compact discs are easily broken, it has not been acceptable, heretofore, to provide unitarily-molded trays without adding opacity producing materials.

Attempts have been made to rigidify the fingers of transparent trays holding the compact discs thereby to provide more support. Exemplary is a tray disclosed in the United States Patent to Joyce et al., U.S. Pat. No. 5,417,324. In the patent, two ribs are used to tie together four opposing spring fingers. While such tied-together fingers reduced finger breakage, they were unsuitable for holding two compact discs. Moreover, they reduce the amount of resilience provided by the fingers and, because of their rigidity, they cannot accommodate holes in compact discs of different diameters. The Gartz patent, U.S. Pat. No. 5,558,220, discloses a rigid central hub for holding two compact discs as an integral part of a transparent tray. While extremely sturdy, users of the tray were limited in their ability to remove compact discs since they could be removed from one direction only because of locking lips which hold the compact discs in place on the tray.

SUMMARY OF THE INVENTION

The present invention relates to a molded tray formed of conventional tray-molding plastics for holding two compact discs which can fit into a conventional case of a width previously used for holding only one compact disc. It is especially useful with transparent polystyrene trays for fitting in conventional transparent cases, although other conventional plastics can be used for the trays irrespective of whether or not they are transparent.

Compact discs have an outer edge and a center hole defined by an internal rim. They vary considerably in thicknesses from one to the next and the diameters of their center holes can vary also. The discs can have thicknesses between about 1.0 and 1.6 mm and the center hole diameters can be between about 14.90 and 15.15 mm. These variations in hole diameters and thicknesses make it difficult to provide a flexible retention mechanism that is strong enough withstand placement and removal of the discs. The conventional case includes the base which has a rectangular flat bottom and side walls rising from the edges of the flat bottom. The tray has a generally rectangular shape and is fitted and hinged into the base, as is the prior art. The tray includes planar surfaces on each side thereof which form disc-receiving portions of the tray. The hinge can be located either at one end or the other of the tray so the tray can be folded from the case either in a portfolio-style or a book-style configuration. In either configuration, both surfaces of the tray are available to receive a compact disc and provide access for the consumer.

The invention involves a double-sided tray having planar surfaces on each side. The tray has a central hub which comprises a radially inwardly-directed array of flexible tabs disposed around an opening in the tray. Each of the tabs has a first projection (a prong) on one side and a second projection (a support) on the other side. Each of the tabs can flex transversely when a first disc is placed thereover to inhibit motion of the first disc by the first projections and simultaneously inhibit substantial lateral movement of a second disc on the other side of the tray by constraining the motion of the second disc with the second projections. The first projections are biased radially inwardly so when a first disc is pressed thereagainst it is engaged by the first projections which force the second projections on the other side of the tabs to be simultaneously biased radially outwardly to inhibit substantial lateral movement of a second disc retained on the other side of the tray. Because of the flexure of the tabs and the shifting of the first projections, compact discs of dimensionally off-perfect sizes can be housed on the tray, even when they are made of fairly brittle molding materials such as polystyrene.

The tabs have proximal and distal ends. The proximal ends are attached to the opening in the tray and molded as an integral part thereof. The distal ends are free to reciprocate within the opening. Prongs are disposed on one side of the distal ends and are arranged to reciprocate with the tabs when the prongs are engaged by the internal rim of a compact disc. The prongs grasp the internal rim (cooperatively with other prongs on other tabs of the array) to detachably hold one compact disc on the tray in a resilient, interference fit. Shoulders are disposed on the opposite side of the distal end of the tabs. The shoulders are arranged to reciprocate with the tabs when the prongs are engaged by the internal rim of the first disc to support the internal rim of a second compact disc to inhibit substantial lateral movement of a second compact disc held by prongs on the opposite side of the tray, thereby to reduce breakage of the tabs by substantial lateral movement of the compact discs. Some of the prongs in the array are arranged on the face side of the tray and others of the prongs are arranged on the obverse side and some of the shoulders are arranged on the face side of the tray and others of the shoulders are arranged on the obverse side. Where there is a prong on one side of the tab, there is a shoulder on the other side.

In the tray of my invention, the heights of the shoulders relative to the prongs are such that when a compact disc is placed over the prongs on one side, the shoulders on the opposite side can rest upon a separate surface (such as the inside of the cover or the base) to reduce breakage of elements of the hub. Additionally, retention of compact discs on the tray is enhanced by including small undercuts or reliefs between the tips of the prongs to allow the shoulders to shift radially inwardly and then outwardly again as a disc is being placed on the tray, even when another disc is already stored on the other side of the tray.

BRIEF DESCRIPTION OF THE DRAWINGS

FIG. 2 is a fragmentary view of the hub of an embodiment of the present invention. FIGS. 2A and 2B are enlarged cross-sectional views of elements of the hub taken along the lines A—A and B—B, respectively, with compact discs (CDs) placed thereon to illustrate their placement and the operation of the hub.

FIG. 4 is an enlarged, fragmentary cross-sectional view of the tabs and their distal projections in a relaxed state without compact discs being placed thereon.

DESCRIPTION OF THE PREFERRED EMBODIMENTS

Figure 1:
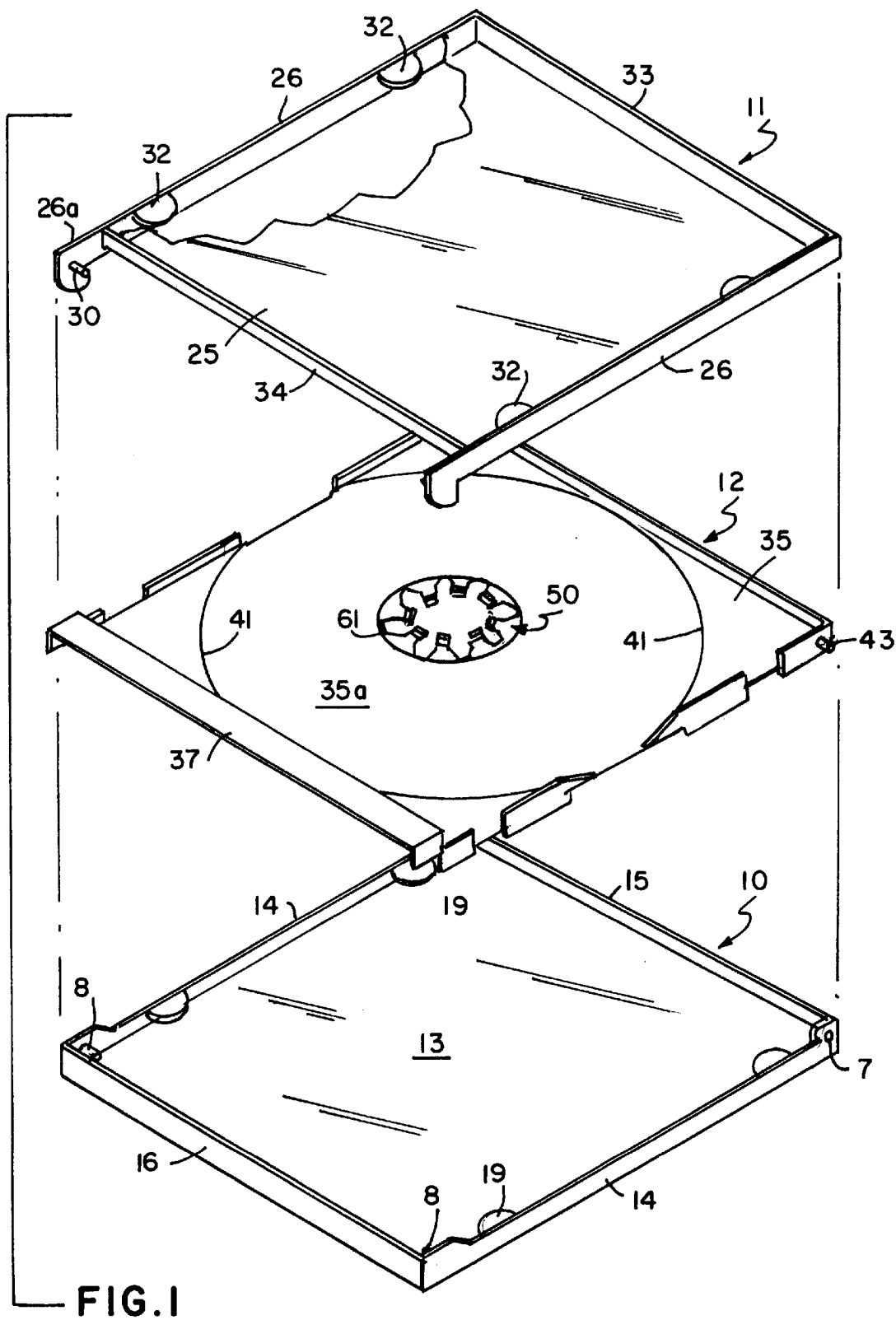
FIG. 1 is an expanded perspective view of a compact disc case with a tray according to the present invention showing the base, the double-sided tray and the cover.

Referring to FIG. 1, a base 10 comprises a flat rectangular bottom wall 13, two lateral side walls 14, a front wall 15 and a back wall 16. Each of the side walls 14 adjacent the back wall 16 is provided with holes 8 which will receive corresponding spindles on the cover, as will be described hereinafter. The side walls 14 adjacent the front wall 15 are provided with nodes 7 to fit into notch on cover 11 for retaining the cover 11 when it is folded onto the base 10.

A title sheet (not shown) can be placed on the bottom wall 13 of the base 10. This sheet is folded back at the front and at the rear to allow the title to be seen in small print through the back wall 16 and the front wall 15 of the case. The title sheet is fitted beneath holders 19 which are spaced from the bottom wall 13 to hold the sheet in place. With the transparent tray of the present invention both sides of the sheet can be seen by the user when the tray 12 is place.

The cover 11 comprises a flat rectangular wall 25, almost square because its length is shorter than base 10. Its front and back sides have the same length as the front and back sides of the bottom 13 of the base 10 and its lateral sides are shorter than the lateral sides of the bottom 13. The cover 11 comprises two lateral side walls 26, a back wall 33 and a front wall 34. The lateral side walls 26 extend beyond the rear wall 33 of the cover to form two arms 26a. These arms 26a are provided with spindles 30 intended to be inserted into holes 8 in the base 10. Thus, the lateral walls 26 of the cover 11 enclose the walls 14 of the base 10. The front edge rests on the upper edge of the front wall 15 of the base 10. The cover also includes holders 32 which extend toward the interior panel of the bottom 13 and which leave a narrow space in which a booklet (not shown) with an illustrated cover page can be slipped. The booklet is stopped at the rear by the rear wall 33.

The disc-holding tray 12 comprises a rectangular plate 35 including a back edge, a front edge and two lateral edges. The rear of the plate 35 includes a strip 37 which, in the closed position of the case, rests on the upper edge of the back wall 16 of the base 10. A hub 50 is centrally molded on disc-receiving surface 35a of the tray 12 to retain discs (on each side thereof), as will be discussed hereinafter. A ring 41 is formed on the tray in a location which can engage the outer edge of the disc to prevent the body of the disc from touching the tray 35. The ring 41 defines the disc-receiving surface 35a. A ring 61 is formed adjacent the hub 50 and serves to space the recording portions of the disc from the surface of the tray 25. In this embodiment, the ring 61 also serves to define the perimeter of the hub, as will be described hereinafter.

The tray 12 has spindles 43 extending from the lateral side edges adjacent the front edge. These spindles 43 are adapted to be disposed in openings 7 in the lateral side walls 14 of the base 10. In the illustrated embodiment, the openings 7 are adjacent the front wall 15 of the base 10. In this way the tray 12 can be swung portfolio-style from inside the base 10 to enable a user to have access to either surface of the tray. In another embodiment, (not shown) the spindles 43 can be placed adjacent the strip 37 and fitted into openings in the side walls 14 adjacent the back wall 16. In this latter case, access to both surfaces of the tray 12 is provided in a book-like fashion.

As shown in FIG. 2, hub 50 comprises an array of radially-disposed tabs 51 extending from disc-receiving surface 35a upon which the compact discs are placed. Each of the tabs 51 are on the same plane. The proximal ends of the tabs 51 extend from the disc-receiving surface 35a at a tray opening 61 (illustrated by dotted and full lines in this Figure of the drawing) which can serve a dual function, if desired. If the edge of tray opening 61 is made thicker, it can also space the compact disc from the disc-receiving surface 35a to prevent the data-receiving surface from being damaged, as is well known. On the other hand, if a separate spacing ring (not shown) is used, it should be spaced about 1.0 to 3.0 mm from the tray opening 61 and then there is no need to widen the tray-receiving surface at the juncture between the tabs 51 and the disc-receiving surface 35a.

Prongs 54 have heights between about 2.75 and 2.85 mm and are disposed on the distal ends of the tabs 51. The distal ends of tabs 51 are arranged to reciprocate with prongs 54 when the tips are engaged by the internal rim of a compact disc. As shown in the drawing, four prongs 54 are radially disposed around the tray opening 61. These prongs 54 cooperate with each other to detachably hold a compact disc on the tray surface 35a. Four shoulders 55 having heights between about 2.35 and 2.45 mm and are disposed on the balance of the tabs 51. These shoulders 55 act to support the internal rim of another compact disc against substantial lateral movement, thereby reducing breakage of the tabs 51. The other side of the tray can be identical to the illustrated side, except where there are prongs on the illustrated side there are shoulders on the other side and where there are shoulders on the illustrated side there are prongs on the other side. The shoulders 55 also act as supports for the hub on the other side of the tray when a compact disc is being placed thereon because they engage a surface of the case to support the elements of the tray against breakage. The inner surfaces 55a of opposing shoulders 55 (on opposing tabs 51) are slightly closer to each other, 14.2 to 14.6 mm, than the inner surfaces 54a of the prongs 54 which are spaced between about 15.3 to 15.5 mm apart at their tips and decrease to about 15.2 to 15.4 mm at their bottoms, adjacent the tabs 51. Of course, where there is an uneven number of tabs around the opening, the spacing should be half of the above mentioned spacings, measured from the center line of the tray opening 61.

In this embodiment, tabs 51 are fairly wide at their bases, that is, where their proximal ends connect to disc-receiving surface 35a at the tray opening 61. The tabs 51 taper to a small width, about 1.5 to 3.5 mm, at their distal ends where the prongs and shoulders are located. To provide for reciprocation of the tabs 51 within the tray opening 61, the tabs 51 are thinner than the disc-receiving surface 35a, the thickness between about 0.8 and 1.1 mm. The thickness of the tray receiving surface 35a is between about 1.0 and 1.3 mm.

Referring now to FIGS. 2A and 2B, in FIG. 2A prongs 54 are shown disposed at the distal end of the face side of tabs 51. Prongs 54 engage the internal rim 60 of a compact disc with their inner surfaces 54a. Shoulders 55 are disposed on the obverse side of the tabs 51 and are spaced slightly from the edge of the compact disc (CD), thereby enabling them to inhibit substantial lateral motion of the compact disc on the obverse side of the tray. When the internal rim 60 of the compact disc engages the prongs 54, the tabs 51 flex transversely and the prongs 54 and are biased radially inwardly within tray opening 61. Simultaneously, shoulders 55 will be biased radially outwardly. A small space of about 0.1 and 0.4 mm is left between the internal rim 60 of the compact disc and the inner surface 55a of the shoulder 55 when the shoulder 55 is biased outwardly. In this way, the prongs 54 are free to move sufficiently out of the way to hold the internal rim 60 of one compact disc but shoulder 55 will not engage the rim 60 of the other compact disc which is stored on the opposite side of the surface 35a. Thus, the inner edges of support 55 are slightly further from the tray opening 61 than are the inner edges of the prongs 54.

FIG. 2B is the reverse of FIG. 2A. In FIG. 2B the shoulders 55 are on the face side and the prongs 54 are on the obverse side. In both cases, that is, the views of FIGS. 2A and 2B, transverse flexing and the reciprocal movement of the distal end of the tab 51 is identical.

Figure 3:
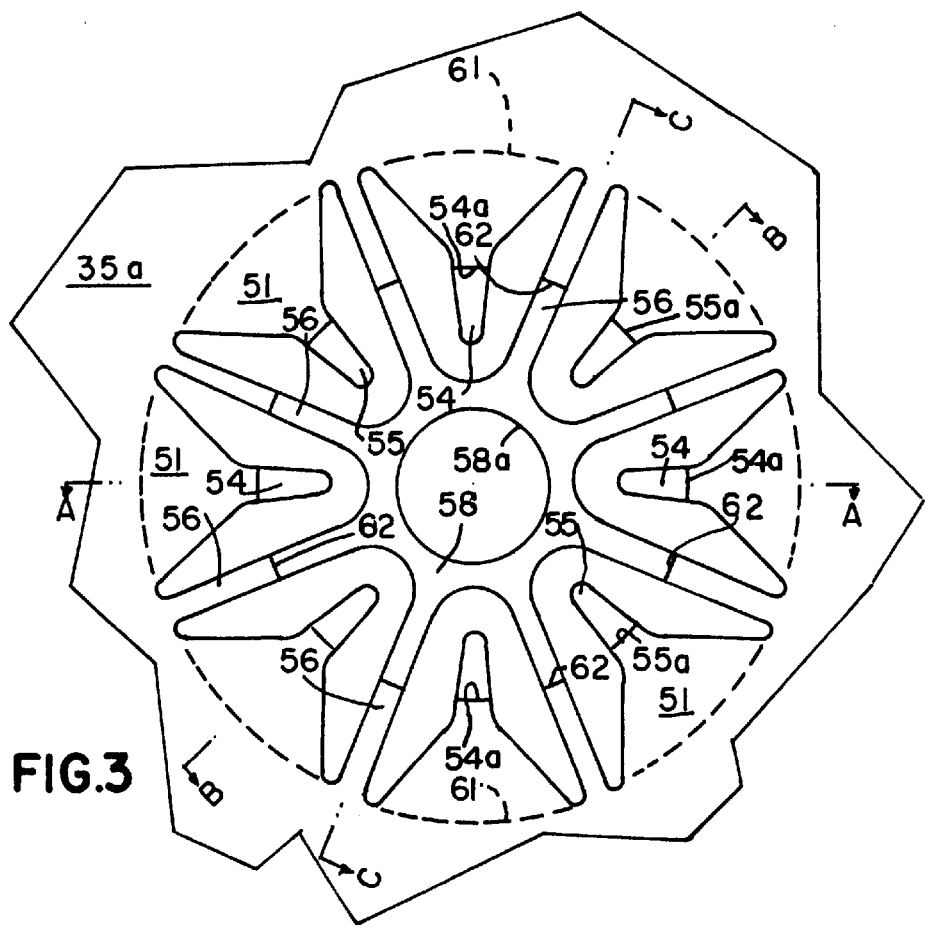
FIG. 3 is a fragmentary view of the hub of another embodiment of the present invention.

As shown in FIG. 3, hub 50 comprises an array of radially-disposed, generally coplanar, tabs 51 extending from a disc-receiving surface 35a which receives the compact discs. Again, the proximal ends of the tabs 51 extend from the disc-receiving surface 35a from a tray opening 61. The operation of the tabs in holding compact discs is identical to the mechanism described in FIG. 2.

The embodiment of FIG. 3 differs from the FIG. 2 embodiment by the addition of a web between the tabs 51. The web comprises a plurality of inwardly-directed, centrally-connected spokes 56 extending from the tray opening 61. A central connection between the spokes 56 is formed by a ring 58 which connects all of the spokes. A central opening 58a is formed in the center of the ring 58. Abutments 62 are disposed on the spokes 56 to provide additional support against substantial lateral movement of a compact disc mounted on the tray. Abutments 62 on spokes 56 on opposite sides of the tray opening 61 are spaced from each other by substantially the same distance as the shoulders 55 are spaced from each other. The abutments 62 are disposed on both the face and obverse sides of the spokes 56, although only one side is shown in this view.

Figure 3A:
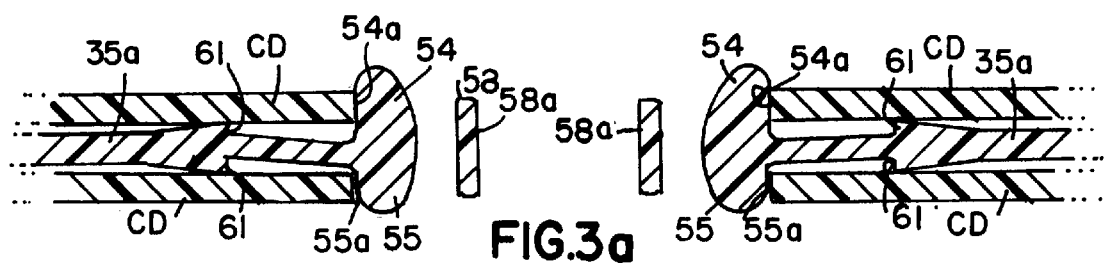
FIGS. 3A, 3B and 3C are enlarged cross-sectional views of elements of the hub taken along the lines A—A, B—B and C—C, respectively, with compact discs (CDs) placed thereon to illustrate their placement and the operation of the hub. In these Figures, a web of spokes is disposed in spaces between the holding-supporting tabs.
Figure 3B:
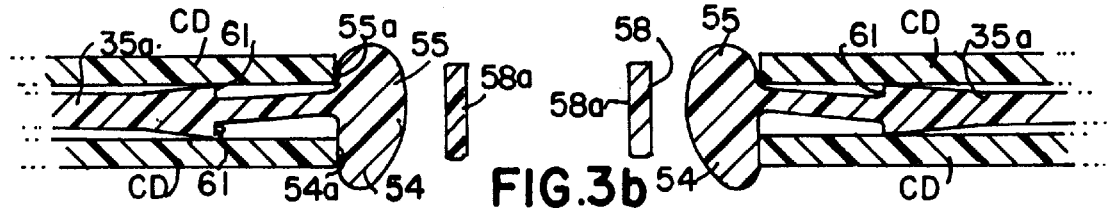
Figure 3C:
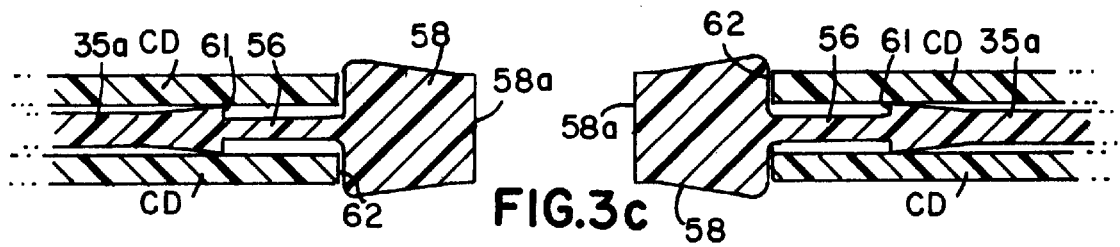

Referring now to FIGS. 3A and 3B, they are identical to FIGS. 2A and 2B. Referring to FIG. 3C, a spoke 56 is shown extending radially outwardly from the tray opening 61. As shown in FIG. 3, the spokes are joined together at their inwardly-directed ends to the ring 58. The ring 58 not only provides for joining together the spokes 56 but central opening 58a forms a locating point for a pin used in automated assembly and packaging of the compact discs and placement of these compact discs on the prongs. The abutments 62 are disposed on each side of the surfaces of each of the spokes 56.

In the illustrated embodiments, eight tabs 51 are shown arranged around the tray opening 61. The number of tabs 51 used to retain compact discs is not especially critical except there generally should be at least six tabs thereby to give three points of contact with their prongs on each side of the tray. When more than twelve tabs are used, they become so small as to break easily, thus diminishing the effectiveness of the invention.

Referring to FIG. 4, a cross-section of disc-receiving surfaces and the tabs of a double-sided tray are shown without the compact discs in place. Tabs 51 have a first projection forming a prong 54 on one side of the tab 51 and a second projection forming a shoulder 55 on the other side of the tab 51. Each of the tabs 51 can flex transversely when a first disc is placed thereover to permit engagement of the first disc by the prong 54 and simultaneously to inhibit substantial lateral movement of a second disc on the tray by engagement of the second disc with the shoulder 55, when the compact disc shifts. The prongs 54 are biased radially inwardly when the first disc is pressed thereagainst to permit the first disc to be engaged by the first projections and to permit the second projections 55 to be simultaneously biased radially outwardly to secure the second disc against substantial lateral movement. A radius is formed on the top of each of the prongs 54 to enable automatic equipment and consumers to place and secure compact discs on the tray easily. As mentioned previously, the internal diameters of the center holes of the compact discs vary. With radii on the tops of the prongs, the center holes of all compact discs can be accommodated and the prongs can still be biased radially inwardly to secure the compact disc on the tray. The relief or undercut formed beneath the tip of the prong 54 is preferably angled between about 2 and 7 degrees from the perpendicular as defined by the tab 51 and illustrated in dotted lines on the drawing. The relief allows accommodation for the variations in thicknesses of compact discs while still holding the compact discs securely on the receiving surface of the tray. A corresponding relief or undercut can be formed in the support 55 on the other side of the tab 51 to allow the tab to reciprocate easily and not engage the inner rim of a compact disc supported by the prongs on that side of the tray.

While it is apparent changes and modifications can be made within the spirit and scope of the present invention, it is my intention, however, only to be limited by the appended claims.

As my invention I claim:

1. A method of securing a first and second disc to a double-sided tray comprising the steps of:
    arranging a plurality of radially inwardly-directed tabs around a tray opening to form a hub;
    providing first projections on one side of said tabs and second projections on the other side of said tabs;
    placing a first disc on said first projections to engage said first projections to flex said tabs transversely within said opening thus moving said second projections to inhibit any substantial lateral movement of a second disc on the opposite side of the tray.

2. The method according to claim 1 wherein the first projections move radially inwardly to engage said first disc while simultaneously moving said second projections radially outwardly to inhibit substantial lateral movement of said second disc secured to the opposite side of said tray by first projections on said opposite side.

3. The method according to claim 1 wherein the tray is molded of transparent polystyrene.

4. A method of securing a first and a second disc to a double-sided tray comprising:
    arranging a plurality of radially inwardly-directed tabs around an opening in said tray;
    arranging an array of first projections and an array of second projections on each side of said tabs, said second projections being disposed more radially inwardly than said first projections;
    placing and securing a disc on said first projections extending from tabs from one side of said tray;
    inhibiting substantial lateral movement of a disc secured on the other side of said tray by said second projections, said disc being disposed on said first projections extending from said tabs, said inhibiting occurring as the discs are being engaged on said tabs on the other side of said tray.

* * * * *